(12) United States Patent
Beadel et al.

(10) Patent No.: US 6,499,816 B1
(45) Date of Patent: Dec. 31, 2002

(54) GRINDING MACHINE ENCLOSURE

(76) Inventors: Norbert L. Beadel, 1232 E. Pomona St., Santa Ana, CA (US) 92707; Raymond Romund, 1232 E. Pomona St., Santa Ana, CA (US) 92707

( * ) Notice: Subject to any disclaimer, the term of this patent is extended or adjusted under 35 U.S.C. 154(b) by 0 days.

(21) Appl. No.: 09/886,076

(22) Filed: Jun. 20, 2001

Related U.S. Application Data

(60) Provisional application No. 60/213,672, filed on Jun. 21, 2000.

(51) Int. Cl.[7] .............................................. A47B 81/00
(52) U.S. Cl. ....................................... 312/209; 312/305
(58) Field of Search ................................ 312/209, 197, 312/137, 138.1, 237, 305, 352, 223.2; 451/64, 65

(56) References Cited

U.S. PATENT DOCUMENTS

| | | | | |
|---|---|---|---|---|
| 2,624,650 A | * | 1/1953 | De Perales | 312/305 |
| 2,657,111 A | * | 10/1953 | Kjellgren | 312/305 X |
| 2,693,989 A | * | 11/1954 | Santana et al. | 312/305 |
| 2,732,199 A | * | 1/1956 | Meinig | 312/305 X |
| 2,882,114 A | * | 4/1959 | Sease et al. | 312/305 X |
| 3,512,859 A | * | 5/1970 | Barroero | 312/305 |
| 5,558,560 A | * | 9/1996 | Uchida | 451/24 |
| 5,618,090 A | * | 4/1997 | Montague et al. | 312/209 |
| 5,862,920 A | * | 1/1999 | Leisner | 312/209 X |
| 6,179,692 B1 | * | 1/2001 | Hara | 451/53 |

FOREIGN PATENT DOCUMENTS

| | | | | |
|---|---|---|---|---|
| AU | 123695 | * | 3/1947 | 312/305 |
| DE | 655987 | * | 1/1938 | 312/305 |

* cited by examiner

Primary Examiner—James O. Hansen
(74) Attorney, Agent, or Firm—Foley & Lardner; Jay P. Hendrickson

(57) ABSTRACT

A grinding machine turret enclosure system and an integrated computer monitor. The turret system comprises a pair of curved turret doors which are disposed between a circular top enclosure and a circular bottom turret platform. Each turret door forms a circular arc of approximately 130°, and each door is slideably positioned within a respective circular channel. Access to a grinding machine staging area is provided by sliding one or both doors in a circular direction, within its channel, away from the other door. When both doors are fully opened, access of approximately 230° is created around the staging area. A computer monitor, which is used to set grinding coordinates, is pivotally attached to the top of the circular enclosure such that a grinding operator may revolve the monitor around the staging area to the area where adjustments are being made.

12 Claims, 4 Drawing Sheets

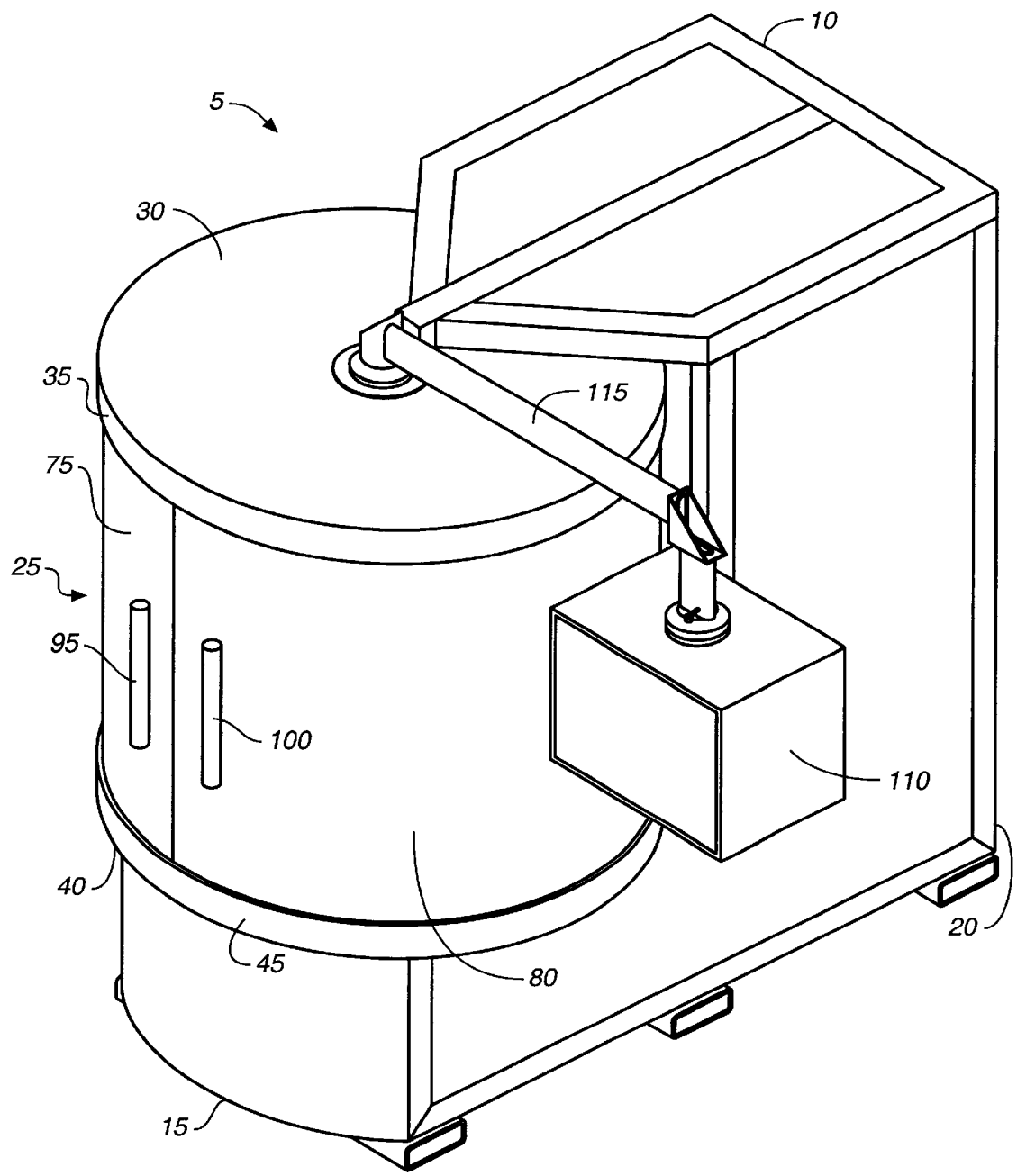
FIG._1

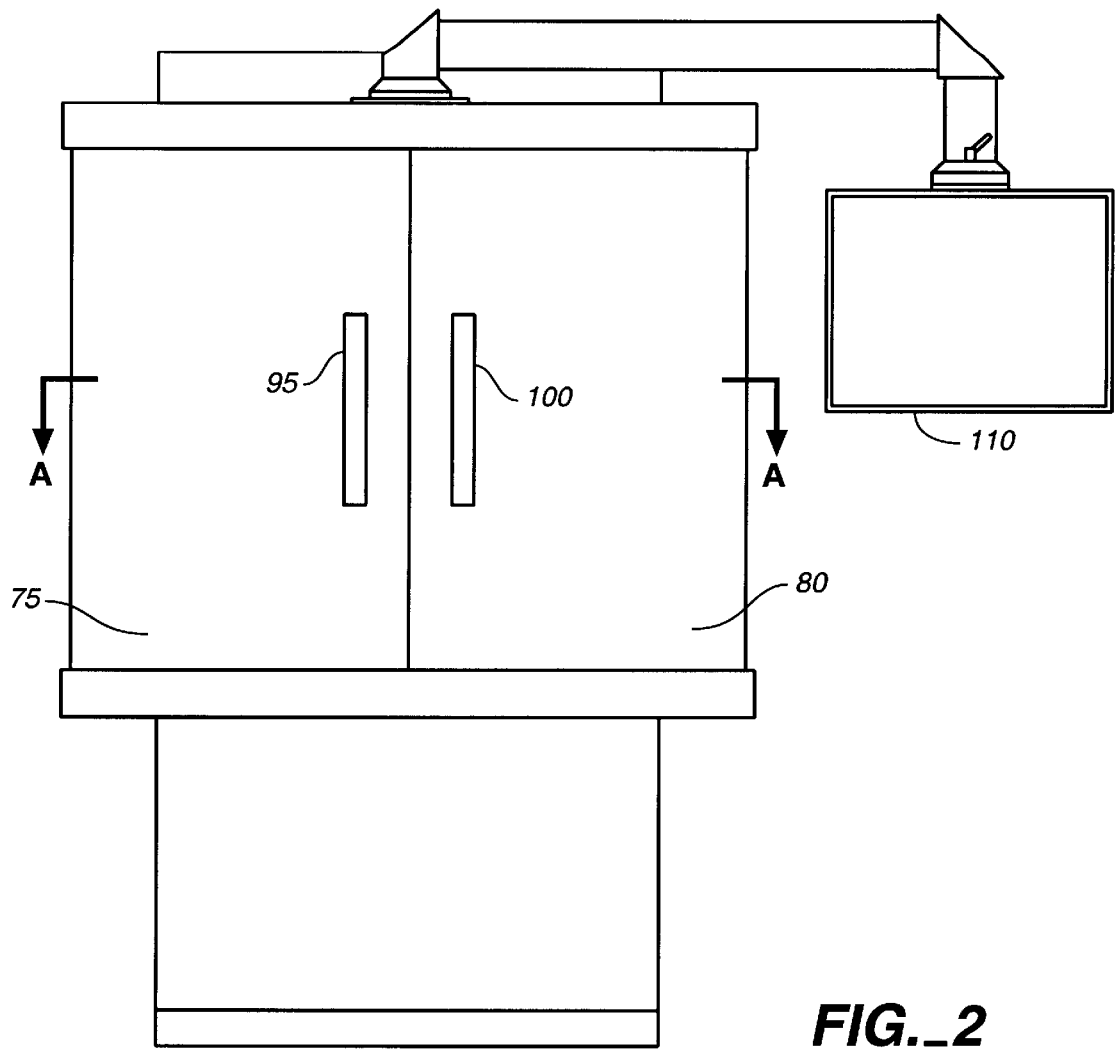
FIG._2

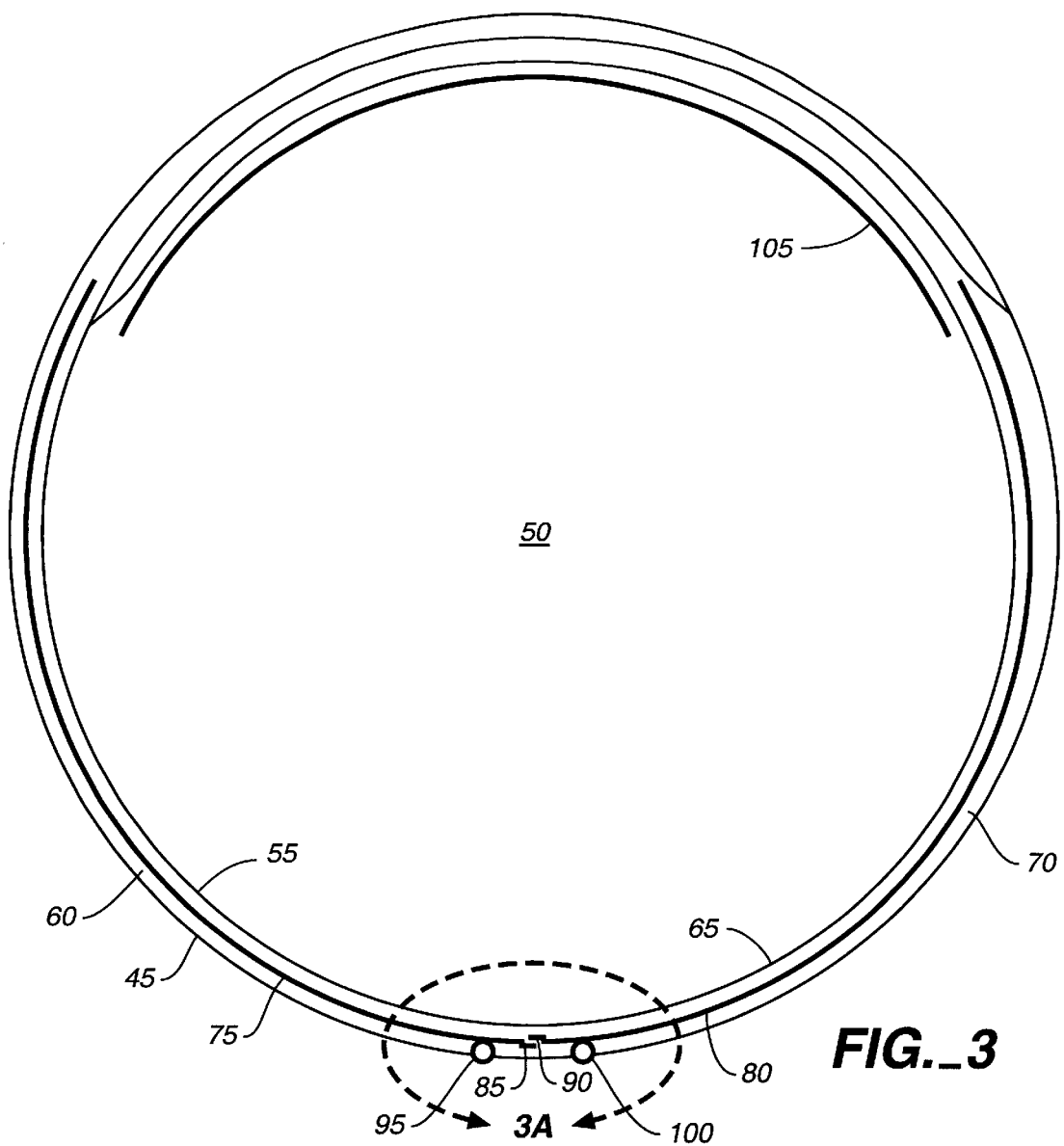
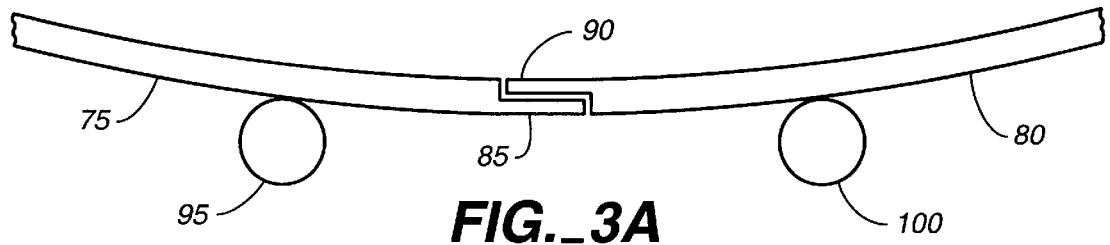

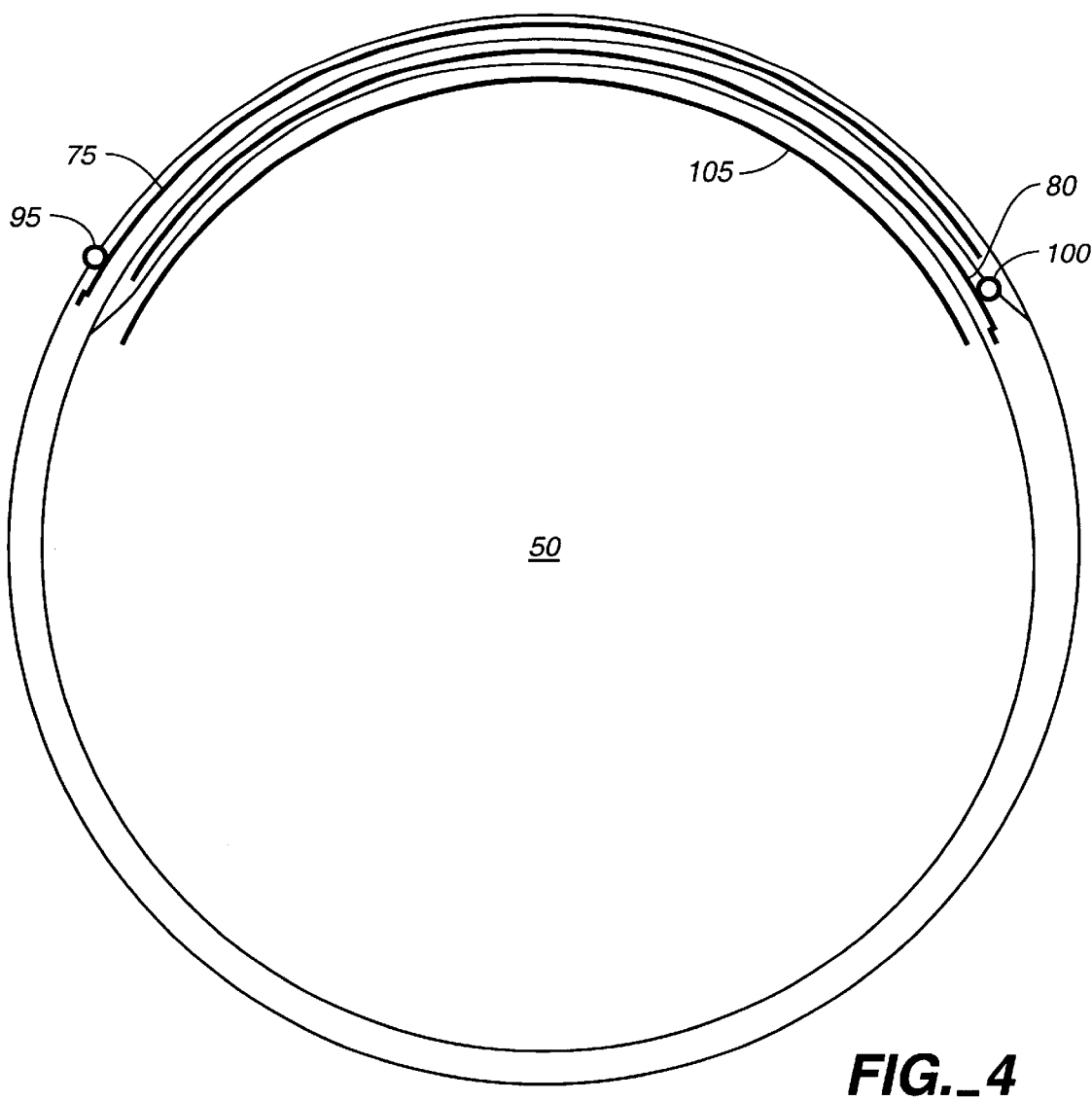
FIG._4

GRINDING MACHINE ENCLOSURE

This application claims the benefit of U.S. Provisional Application No. 60/213,672, filed on Jun. 21, 2000.

BACKGROUND OF THE INVENTION

1. Field of Invention

This invention generally relates to the design of tool maker's grinding machine enclosures.

2. Description of Prior Art

Today, tool maker's grinding machines are generally enclosed within a box-like structure which allows the operator to access the tool making machine apparatus through a hinged access door mounted within a door frame. Once the operator has completed the set up operation to permit the machine to grind a specific tool design, the access door is closed and the machine is turned on. During the grinding operation, lubrication is accomplished by means of a continuous stream of oil which is directed at the grinder and tool. One function of the box-like enclosure is to direct the oil, which splashes in directions away from the grinder and tool, down and through an opening in the bottom of the grinding machine to permit the oil to be cooled and then recycled to be used again as the lubricant.

One of the limitations to the box-like enclosure is that its hinged door must be designed such that when closed it forms a complete seal around the frame to prevent the oil from leaking to the outside of the enclosure. Another significant limitation is that the door only allows the operator to access the grinding or staging area from one direction. Often times this limited access makes it difficult for the grinder and tool to be adjusted and positioned properly to permit a specific grinding operation to be performed. Some designs have addressed this problem by providing additional openings in the two sides of the box-like structure which are adjacent to the hinged door frame. Although these additional openings provide some improvement, access is still restricted where the two additional openings abut the hinged door frame. Further, these additional openings must also be sealed to prevent oil from leaking out of the enclosure.

Another limitation in prior art grinding machine enclosures is that the enclosures restrict the operator's view of the grinding when the machine is being operated. Some prior designs have attempted to address this problem by providing a window in the hinged door and in the two adjacent sides of the enclosure. The operator's view is still particularly restricted, however, by the window frames.

A further limitation of grinding machines as they presently exist relates to the location of the operator's control monitor. Generally, the control monitor is located in a fixed position near the machine and is used by the operator to obtain the starting point coordinates of the grinder and tool, after the operator adjusts their location within the grinding machine. The operator makes these adjustments by using a hand held remote device which is attached to the monitor by means of a long cable. However, the hand held remote can be cumbersome because the operator must lay the remote down in order to use both hands to perform an operation within the staging area. Normally, the safest place to put the remote is on or near the monitor, which requires that the operator leave the grinder and walk over to the monitor, dragging the remote cable along the way. Further, in order to obtain the coordinates, the operator must also walk from the grinder over to the monitor where the coordinates are displayed.

The present invention is a grinding machine enclosure and monitor arrangement which overcome the limitations found in prior art grinders.

DESCRIPTION OF THE INVENTION

The present invention provides a new and unique method and device for accessing a grinding machine's staging area where the tool grinding operation is performed. The invention comprises a grinding machine turret enclosure system and an integrated computer monitor. The turret enclosure system includes a pair of curved turret doors which are disposed between a circular top turret enclosure and a circular bottom turret staging platform. Each turret door forms a circular arc of approximately 130° and is preferably made of transparent acrylic. The bottom end of each turret door rests in a circular channel which is integral to the perimeter of the bottom staging platform. By using handles attached to each turret door, the grinding operator can slide one door, or both doors, in a horizontal and circular track, formed by the channels, away from the other door in order to create a front opening between the two doors. Similarly, the operator may close the front opening by sliding one door, or both doors, toward the other door until their adjacent vertical edges come into contact. The adjacent vertical edges are notched such that when the opening between the two panels is closed, the notched edges overlap each other a sufficient distance to form a seal between the edges. A splash panel is positioned in a back opening which is formed when the two turret doors are closed. The splash panel, however, is not moveable in that it is rigidly connected to the top turret enclosure and bottom turret staging platform.

In operation, the operator may readily access the grinding machine's staging area located within the turret enclosure by simply and efficiently sliding open the two turret doors. In fact, each door can be opened to create an opening of up to approximately 115°, and when both doors are opened to their fullest extent an opening of approximately 230° is created. When both doors are fully opened, each door overlaps the other door, and both doors similarly overlap the outside surface of the splash panel.

It should be readily apparent that the present invention's turret enclosure system overcomes all of the disadvantages of the prior art without introducing any disadvantages. The present invention provides the operator with 230° of unrestricted access around the grinding machine's staging area, while prior art designs provide only limited access through a front door in a rectangular enclosure, or possibly additional access through side window openings. The prior art configurations, however, are unable to eliminate the door and window frame access restrictions which are inherently part of the designs. These prior art designs must also provide elaborate sealing means around the door and windows to ensure that the grinding machine's lubricant does not leak through the enclosure. On the other hand, the present invention provides an inexpensive and efficient means for sealing the turret enclosure when the turret doors are closed by simply overlapping the doors by means of the vertical notched edges.

Another advantage of the present invention is that the turret enclosure system's transparent acrylic turret door design allows the grinding operator to visually inspect the grinding operation being carried out in the machine's staging area. As a result, if a problem develops (e.g., loss of lubricant) remedial action may be taken quickly.

Another aspect of the present invention comprises the grinding machine's integrated coordinate setting computer monitor. A horizontal arm member is pivotally attached at one end to the center of the top surface of the circular top turret enclosure. The arm member's other end is pivotally attached to the top surface of a computer monitor, which is used by the operator to set the relative location of the grinding spindle and the tool which is in position to be ground, both within the staging area. First, the operator opens the turret doors so that he/she has the best possible access to the staging area. Then the operator revolves the monitor around the staging area in order to position the monitor so that it is adjacent to that specific portion of the staging area where access is needed. In this manner, the operator is able to establish the necessary starting point settings and obtain the starting point coordinates without leaving the vicinity of the staging area. This feature is advantageous in that it eliminates the need for the remote hand held device incorporated in prior art designs.

BRIEF DESCRIPTION OF THE DRAWINGS

The present invention is described in additional detail by reference to the accompanying drawings, in which:

FIG. 1 is a front perspective view of the grinding machine and its turret enclosure system with the turret doors closed.

FIG. 2 is a front view of the grinding machine and its turret enclosure system with the turret doors closed, showing cross-section A—A.

FIG. 3 is a partial cross-sectional view along A—A as shown in FIG. 2 of the turret enclosure system with the turret doors closed.

FIG. 3A is an enlarged view of the turret door's notches.

FIG. 4 is a partial cross-sectional view along A—A as shown in FIG. 2 of the turret enclosure system with the turret doors open.

DETAILED DESCRIPTION OF THE INVENTION

A detailed description of the invention is illustrated by referring to the figures. FIG. 1 and FIG. 2 illustrate a grinding machine 5, which generally comprises a grinding machine top panel 10, a grinding machine base housing 15 and a rear housing 20 which extends vertically between the top panel 10 and the base housing 15. A turret enclosure system 25 is disposed between the top panel 10 and the base housing 15, and is positioned in front of the rear housing 20. The turret enclosure system 25 comprises a circular top turret enclosure 30 having a top, outside circularly shaped surface and a bottom, inside circularly shaped surface (not shown) and having a cylindrical edge 35 extending down from the perimeter of the enclosure 30. The turret enclosure system further comprises a circular bottom turret platform 40 which is disposed below and in axial alignment with the top turret enclosure 30. The turret platform 40 has a cylindrical turret edge 45 which extends upwardly from the perimeter of the turret platform 40 and, as shown in FIG. 3, the platform has a top, inside, circularly shaped staging surface 50 having a front and rear area. In this regard, the area above the staging surface 50 and below the top turret enclosure 30 is identified as the staging area.

As further shown in FIG. 3, the staging surface 50 contains two circular arc shaped channel members which project upwardly approximately 4 inches from the staging surface 50. A first end of a first arc shaped channel member 55 is positioned adjacent to the front area of the staging surface 50 and is spaced approximately 1 inch away from the inside surface of the cylindrical turret edge 45. From this position, the first channel member 55 extends clockwise around the perimeter of the staging surface 50 forming an arc of approximately 240° and terminates at its opposite second end which is adjacent to the inside surface of the cylindrical turret edge 45. In this manner, the first channel member 55, the cylindrical turret edge 45, and turret staging surface 50 form a first channel 60. A first end of a second arc shaped channel member 65 is also positioned adjacent to the front area of the staging surface 50 and is spaced approximately 1 inch away from the inside surface of the cylindrical turret edge 45, such that said first end of the second channel member 65 abuts the first end of said first channel member 55. From this position, the second channel member 65 extends around the perimeter of the staging area forming an arc of approximately 240° and terminates at an opposite second end, which is adjacent to the inside surface of the first channel member 55. In this manner, the second channel member 65, the cylindrical turret edge 45, the first channel member 55 and the turret staging surface 50, form a second channel 70.

As further shown in FIGS. 1 and 2, a pair of flexible first and second turret doors, 75 and 80, are disposed between the circular top turret enclosure 30 and the circular bottom turret platform 40, and each door forms a circular arc of approximately 130°. And, as shown in FIG. 3, a bottom edge of the first turret door 75 is slideably positioned within the first channel 60, and a bottom edge of the second turret door 80 is slideably positioned within the second channel 70. In a closed position, a first vertical front edge 85 of the first turret door 75 abuts against a second vertical front edge 90 of the second turret door 80, and each abutting edge contains a vertical notch which mates and overlaps with an opposite asymmetrical notch. The mated and overlapping notches form a seal between the two edges, 85 and 90. FIG. 3A illustrates the mated and overlapping notches. Turret door 75, is provided with a handle, 95 and turret door 80 is provided with a handle 100, and each handle is attached to the outside surface of its respective door and extends vertically along the outside surface. A back splash panel 105 is positioned within the rear area of the staging surface and is vertically disposed between the circular top turret enclosure 30 and the circular bottom turret platform 40, and the splash panel 105 forms a circular arc of approximately 120°. A bottom edge of the splash panel 105 is attached to the staging surface 50 and is adjacent to the second channel 70, and its top edge is attached to the inside surface of the top turret enclosure 30. The splash panel 105 is positioned such that, when both turret doors are closed and, thus, form a rear circular arc opening of approximately 100°, the outside surface of the splash panel 105, adjacent to one of its vertical edges, overlaps the inside surface of one of the turret doors, adjacent to one of its vertical edges, and the outside surface of the splash panel 105, adjacent to its other vertical edge, overlaps the inside surface of the other turret door, adjacent to one of its vertical edges.

Referring to FIGS. 3 and 4, it is shown that in operation each door handle, 95 and 100, may be used by a grinding machine operator to slideably open or close a turret door by simply applying a pulling or pushing force approximately parallel to the horizontal staging surface 50. The first turret door 75 slides open and closed within the first channel 60, and the second turret door 80 slides open and closed within the second channel 70. When one turret door of the turret enclosure system 25 is opened to its fullest extent, the machine operator is provided with an opening into the staging surface 50 and staging area approximately 115° from the front of the staging surface 50 and around the perimeter of the staging surface 50. When both doors are opened to their fullest extent, as shown in FIG. 4, access to the staging surface 50 and staging area is increased to an opening of approximately 230°.

Referring once again to FIG. 1, another aspect of the invention comprises a pivotal computer monitor 110 which is used to electronically set the coordinates needed to align and position the machine's grinding operation. A horizontal arm member 115 is pivotally attached at one end to the center portion of the top surface of the circular top turret enclosure 30, and the arm member's other end forms a vertical segment which extends downwardly from the arm member, and the vertical segment's bottom end is pivotally attached to the top surface of the computer monitor 110. In operation, the operator opens both turret door in order to obtain 230° of access around the staging area. Then the operator revolves the computer monitor 110 around the staging area in order to position the monitor 110 so that it is adjacent to the side of the staging area that the operator needs to access. In this manner, the operator is able to more conveniently use the computer monitor 110 in order to establish the grinding machine's starting point settings and obtain starting point coordinates from the computer monitor 110 without leaving the vicinity of the staging area.

While the present invention has been described with reference to a few embodiments, the description is illustrative of the invention and is not to be construed as limiting the invention. Various modifications may occur to those skilled in the art without departing from the scope of the invention as defined by the appended claims.

We claim:

1. A grinding machine and an associated grinding machine turret enclosure system, said system comprising:

a) a circularly shaped top turret enclosure having a top and bottom surface, a circularly shaped bottom turret platform, said turret platform axially aligned with the turret enclosure, a circularly shaped horizontal staging surface, having a front area and a rear area, is disposed within the bottom turret platform, said staging surface having a first channel extending a predetermined distance from the front area of the staging surface in a circular direction around the staging surface's perimeter, and a second channel extending a predetermined distance from the front area of the staging surface in an opposite circular direction around the staging surface's perimeter, said second channel adjacent to a portion of the first channel;

b) a turret splash panel having a horizontally curved top and bottom end and opposite vertical edges is vertically disposed between the top turret enclosure and bottom turret platform with the splash panel's bottom end attached to the staging surface's rear area and adjacent to the second channel, and the splash panel's top end is attached to the bottom surface of the top turret enclosure;

c) a pair of first and second turret doors disposed between the top turret enclosure and bottom turret platform, each door having opposite vertical edges and horizontally curved top and bottom ends, said bottom end of the first door slideably positioned within the first channel and said bottom end of the second door slideably positioned within the second channel, and each door having a handle attached to the door's outside surface; whereby each turret door may be opened by using its handle to pull or push the door in a horizontal direction, causing the door to slide in a circular path in its channel and creating an opening to the staging surface and a staging area above the surface, and in a similar fashion, each turret door may be closed by using its handle to pull or push the door in the opposite horizontal direction, causing the door to slide in a circular path in its channel and to enclose the staging surface.

2. The system of claim 1, in which the first channel extends 240° around the staging surface's perimeter.

3. The system of claim 1, in which the second channel extends 240° around the staging surface's perimeter.

4. The system of claim 1, in which the first turret door's curved top and bottom end each form a circular arc of approximately 130°.

5. The system of claim 1, in which the second turret door's curved top and bottom end each form a circular arc of approximately 130°.

6. The system of claim 1 in which the splash panel's top and bottom ends form a circular arc of approximately 120°.

7. The system of claim 1 in which the first and second turret doors are made of a transparent material.

8. The system of claim 1 in which the first and second turret doors are made of a flexible material.

9. The system of claim 1 in which the first and second turret doors are made of acrylic.

10. The system of claim 1 in which the splash panel is made of stainless steel.

11. The system of claim 1 in which each turret door has a vertical notch within one of each said door's vertical edge, whereby when the doors are closed, each door's notch overlaps the other door's notch, forming a seal between said doors.

12. The system of claim 1 in which a horizontal turret arm member is pivotally attached at one end to the center of the circularly shaped top turret enclosure's top surface and at its other end is pivotally attached to the top surface of a computer monitor, whereby the computer monitor may be revolved around the top turret enclosure and positioned adjacent to an operator who is accessing the staging surface and a staging area above the surface.

* * * * *